(12) United States Patent
Casey

(10) Patent No.: US 9,665,849 B2
(45) Date of Patent: May 30, 2017

(54) EMPLOYING DEPENDENCY GRAPH IN SOFTWARE BUILD PROJECTS

(71) Applicant: Red Hat, Inc., Raleigh, NC (US)

(72) Inventor: John Dennis Casey, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/633,120

(22) Filed: Feb. 26, 2015

(65) Prior Publication Data

US 2016/0253625 A1  Sep. 1, 2016

(51) Int. Cl.
*G06Q 10/10*  (2012.01)
*G06F 9/445*  (2006.01)
*G06F 9/45*  (2006.01)

(52) U.S. Cl.
CPC .......... *G06Q 10/103* (2013.01); *G06F 8/433* (2013.01); *G06F 9/44521* (2013.01); *G06F 8/427* (2013.01)

(58) Field of Classification Search
CPC .............. G06Q 10/06; G06F 8/20; G06F 8/71
USPC ........................................................ 717/101
See application file for complete search history.

(56) References Cited

U.S. PATENT DOCUMENTS

| | | | | |
|---|---|---|---|---|
| 7,484,223 B2 * | 1/2009 | Hill | .......................... | G06F 8/71 717/164 |
| 7,539,976 B1 * | 5/2009 | Ousterhout | ............... | G06F 8/71 717/120 |
| 8,037,453 B1 * | 10/2011 | Zawadzki | ................. | G06F 8/71 717/107 |
| 8,381,176 B1 | 2/2013 | Bentley et al. | | |
| 8,813,031 B2 | 8/2014 | Agarwal | | |
| 2007/0162903 A1 * | 7/2007 | Babb | ........................ | G06F 8/75 717/154 |
| 2008/0134138 A1 * | 6/2008 | Chamieh | ............... | G06F 9/4428 717/105 |
| 2010/0050156 A1 | 2/2010 | Bonanno et al. | | |
| 2010/0153920 A1 | 6/2010 | Bonnet | | |
| 2011/0239195 A1 | 9/2011 | Lin et al. | | |

(Continued)

OTHER PUBLICATIONS

German, Daniel M.; "Using Software Distributions to Understand the Relationship Among Free and Open Source Software Projects"; 29th International Conference on Software Engineering Workshops (ICSEW'07); IEEE Computer Society; http://svn.tribler.org/abc/branches/leo/dataset/preferences/frank/frank-22.pdf; 8 pages.

(Continued)

*Primary Examiner* — John Chavis
(74) *Attorney, Agent, or Firm* — Lowenstein Sandler LLP

(57) ABSTRACT

A mechanism for employing dependency graph in software build projects is disclosed. A method of implementation of the invention includes receiving a first build script file associated with a software project, the first build script file identifying a plurality of project dependencies associated with the software project. The method also includes parsing the first build script file to generate a project dependency graph corresponding to the first build script file. The project dependency graph includes a plurality of vertices representing to the plurality of software project dependencies and further includes a plurality of edges representing relationships between the plurality of the software project dependencies. The method also includes determining a build order of the plurality of software project dependencies using the project dependency graph.

20 Claims, 8 Drawing Sheets

(56) References Cited

U.S. PATENT DOCUMENTS

| | | | |
|---|---|---|---|
| 2012/0017205 A1* | 1/2012 | Mahajan | G06F 8/43 717/170 |
| 2013/0174124 A1 | 7/2013 | Watters et al. | |
| 2014/0019949 A1* | 1/2014 | Craymer | G06F 8/443 717/150 |
| 2014/0033186 A1* | 1/2014 | Bonanno | G06F 8/71 717/156 |
| 2014/0074849 A1 | 3/2014 | Zizka et al. | |
| 2014/0282450 A1 | 9/2014 | Jubran et al. | |
| 2015/0370551 A1* | 12/2015 | Mahajan | G06F 8/43 717/170 |
| 2016/0055411 A1* | 2/2016 | Buchanan | G06N 7/005 706/11 |
| 2016/0103677 A1* | 4/2016 | Melski | G06F 9/52 717/120 |

OTHER PUBLICATIONS

Raemaekers, et al.; Mining Metrics, Changes and Dependencies from the Maven Dependency Dataset; Delft University of Technology Software Engineering Research Group Technical Report Series; 2013; 8 pages.

* cited by examiner

FIG. 2    200

EMPLOYING DEPENDENCY GRAPH IN SOFTWARE BUILD PROJECTS

TECHNICAL FIELD

The implementations of the invention relate generally to project build management and, more specifically, relate to employing dependency graphs in software build projects.

BACKGROUND

A build script management (BSM) system allows a software project to be built using a set of build system components that are shared by all projects, thus providing a uniform build system. A software build project may be associated with a project root directory including source code, which may be used to produce one or more software artifacts or packages. An artifact is a file produced as output of a project build. Each individual project may have configurations such as software project dependencies on other projects or third-party libraries that are used during build of the project. A project may have multiple software project dependencies, each of which may have its own software dependencies.

BRIEF DESCRIPTION OF THE DRAWINGS

The invention will be understood more fully from the detailed description given below and from the accompanying drawings of various implementations of the invention. The drawings, however, should not be taken to limit the invention to the specific implementations, but are for explanation and understanding only.

DETAILED DESCRIPTION

Implementations of the present invention provide for employing a dependency graph in software build projects. In one implementation, a dependency graph build and management component may be employed to employ the dependencies to generate a dependency graph for building a certain software project. Such a dependency graph may be built by processing a build script and other configuration files associated with the project. The dependency graph build and management component functions to ascertain that all the software project dependencies are complete and accurate prior to the build of the project. As a result, any errors resulting in building the projects are eliminated prior to shipping them all together in a single software package.

In previous implementations in the BSM system, when attempting to employ a dependency graph to build a set of software projects and their configurations for the purposes of shipping them all together in a single package, it is common to find that the order of the builds was not accurately determined and further the software project dependencies in the dependency graph were not accurate and/or complete. As such, many errors would be encountered in building the software projects.

Implementations of the disclosure improve the BSM system by processing the generated dependency graph to generate repositories (collection of artifacts) in order for the project to run. Artifacts are binary components of projects that are physically required to be present and correct for a piece of software to execute. The artifacts in the generated repositories are dependency artifacts for a particular project such that these dependency artifacts are combined with local project artifact in order to execute the project. Also, the dependency graphs are exposed to in a format that other users could readily reference from their own projects, thereby improving the usability of the software. Implementations of the disclosure also improve the BSM system by processing the dependency graph to generate an order in which multiple projects contained within the dependency graph are to build in order to avoid any missing dependency artifacts.

Figure 1:
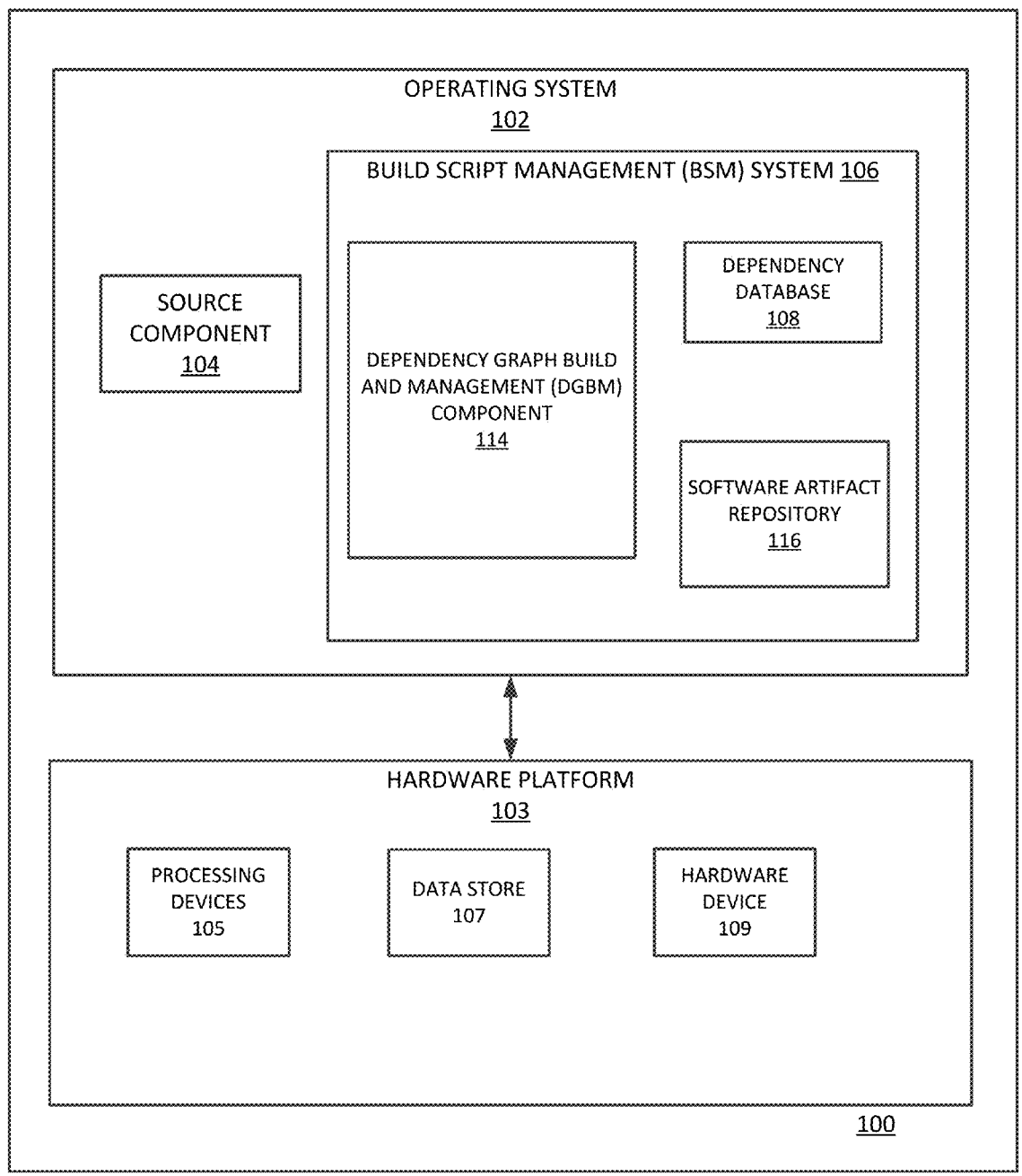
FIG. 1 illustrates a block diagram of a computer system in which the implementations of the disclosure may operate.

FIG. 1 is a block diagram illustrating one implementation of a computer system 100 for building and packaging software. In one implementation, the computer system 100 may be a machine such as, for example, any variety of user devices, such as a personal computer (PC), a laptop, a mobile phone, mobile smart phone, a tablet computer, handheld devices, netbooks, or any other computing device. Furthermore, computer system 100 may comprise a server device, such as a mainframe server device or any other type of server device. The computer system 100 comprises a hardware platform 103, on top of which runs an operating system (OS) 102. The OS 102 may include Microsoft™, Linux™ Solaris™, Mac™ OS or any other suitable OS for managing operations on the computer system 100.

The hardware platform 103 may include one or more processing devices 105 and a data store 107. In one implementation, the data store 107 comprises one or more hardware or software devices, which may be located internally or externally to the computer system 100. Examples of data store 107 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 103 may include additional hardware devices 109, such as network interface cards (NICs), sound or video adaptors, photo/video cameras, printer devices, keyboards, displays or any other suitable device intended to be coupled to a computer system.

In one implementation, the OS 102 includes a source component 104 and a build script management (BSM) system 106 having a dependency database 108, and a repository 116. The source component 104 is a repository, which includes a source code having a plurality of build script files A build script defines a sequence of build operations, which are associated with a project, to be performed in order to produce a software product. Each operation specifies a build tool to be used including a source code and/or other artifacts to be processed. Each of the plurality of build script files includes an identifier. The identifier is unique to the build script files for a project build and is used to identify a collected output (executable) from a single module in project build. In one example, the build script file is a Maven project object management (POM) file. In one example, an identifier includes identification of a group, identification of the artifact and a version of the artifact to be built. In one example, the source code is a JAVA™ source code.

The build script file may also include software project dependencies (a.k.a. dependencies) on other projects. In one implementation, a dependency is an artifact needed to perform the operations specified in the project. The dependency maybe a plugin for the BSM system 106 required to build the project source code into an executable artifact. As such, the 'type' of dependency (eg. plugin vs. library dependency) may be captured.

In one implementation, the build script file may also include metadata, which defines a relationship between the identifiers or the projects in the software artifact. The metadata may include a way in which the dependency is used for the project. One example is a 'test' metadata in which the dependency is not required by the software during its normal execution, but is required in order to execute the tests for the project software. Another example is a 'runtime' metadata, in which the dependency is only required for the project loads at runtime (i.e. when the application executes). A further example is 'compile-time' metadata, in which the dependency is required not only for the project to load at runtime, but is also necessary for compilation to succeed.

In one implementation, the BSM system 106 includes a dependency graph build and management (DGBM) component 114, which retrieves a plurality of build script files including an identifier having corresponding dependencies and metadata. In one embodiment, the DGBM component 114 parses the build script file to retrieve all references from the dependencies to other projects along with the metadata. In one implementation, the DGBM component 114 retrieves identifier from the parsed build file. The DGBM component 114, may store the identifier and the metadata in dependency database 108. As such, when another identifier needs the references to the other projects the references and the metadata can be queried and retrieved from the dependency database.

In one implementation, the DGBM component 114 determines whether the identifier referenced in the build script is marked as complete. In one implementation, the DGBM component 114 checks each of the identifiers in the dependency database 108 to determine whether a project referenced from the corresponding dependencies is identified. In one implementation, the DGBM component 114 determines the identifier as marked complete when a project referenced from its dependencies is identified. As such, the complete identifier includes the references to the project and the corresponding metadata. As discussed above, the metadata defines a relationship between the identifiers or the projects in the software artifact. In one implementation, the DGBM component 114 determines the identifier as incomplete when none of the projects referenced from its dependencies have been identified. In one implementation, the identifier marked as incomplete is added to an output list of identifiers to be processed.

In one implementation, when an identifier is referenced as a dependency for the first time in the dependency database 108, it is marked as incomplete. When an error occurs while discovering the dependency of this identifier, or when discovery never takes place for it, the identifier will remain marked as incomplete. The error may occur when none of the projects referenced from its dependencies in the build script have been identified. In one implementation, any graph operations (build-order construction, repository generation, etc) that include the identifier that is marked as incomplete attempts discovery of a dependency graph for the missing references as described herein below. In one implementation, a project may have zero dependencies. As such, any identifier encountered in the dependency graph database 108 associated with the project having zero dependencies is marked as complete.

In one implementation, the dependency graph build and management (DGBM) component 114 determines an order (build order) to build a set of projects using the dependency graph based on the projects' dependencies as discovered above. The DGBM component 114 retrieves a root identifier selected by a user. In one implementation, the root identifier is the identifier to check first in the dependency database. In one implementation, the DGBM component 114 retrieves a set of identifiers referenced by a selected identifier from the dependency database 108. The DGBM component 114 may determine whether each of the referenced identifiers is present in the output list of the identifiers.

In one implementation, when the DGBM component 114 determines that each of the referenced identifiers is not present in the output list of the identifiers, then DGBM component 114 may insert the referenced identifier to a position just ahead of the selected identifier. The DGBM component 114 may repeat retrieving the set of identifiers for the referenced identifier, which is now set as the current selected identifier and determine whether each of the referenced identifier, which is now set as the current selected identifier is present in the output list of the identifiers.

In one implementation, when the DGBM component 114 determines that each of the referenced identifiers is not present in the output list of the identifiers, then DGBM component 114 may insert the referenced identifier in the output list immediately preceding the currently selected identifier. In one implementation, when the DGBM component 114 determines that the referenced identifier is present in the output list and its position precedes the currently selected identifier, then the DGBM component 114 may stop processing the referenced identifier and send the output list of identifiers. In one implementation, when the DGBM component 114 determines that the index of the referenced identifier does not precede the currently selected identifier, then the DGBM component 114 may move the referenced identifier to a position just ahead of the currently selected identifier in the output list of the identifiers. In one implementation, the DGBM component 114 sends the output list of identifiers. The output list may be sent to the user.

Figure 2:
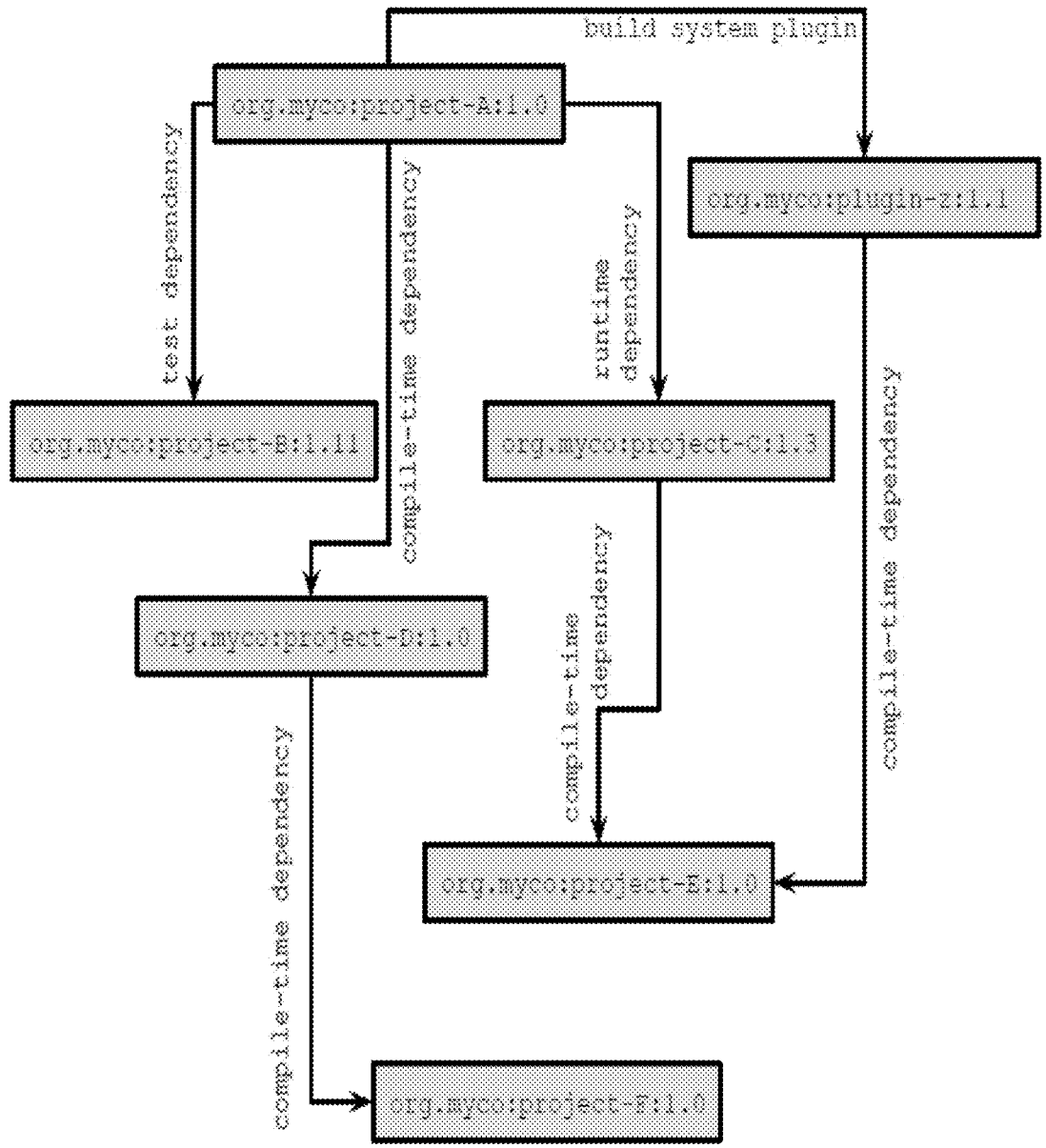
FIG. 2 illustrates an example of a dependency graph of the implementations of the disclosure may operate.

An example of dependency graph 200 is illustrated in FIG. 2. As shown, an "org.myco:project-A:1.0" is a root identifier selected by a user. As discussed above, a build script file may include software project dependencies (a.k.a. dependencies) on other projects. In one implementation, a dependency is an artifact needed to perform the operations specified in the project. The "build system plugin" dependency of the root identifier depends on a Z identifier, "org.myco:project-Z:1.1". The "compile-time" dependency of the Z identifier depends on the E identifier, "org.myco:project-E:1.0". The "run time" dependency of the root identifier depends on a C identifier, "org.myco:project-C:1.3". The "compile-time" dependency of the C identifier depends on the E identifier. The "compile-time" dependency of the root identifier depends on a D identifier, "org.myco:

project-D:1.0". The "compile-time" dependency of the D identifier depends on a F identifier, "org.myco:project-F:1.0". The "test" dependency of the root identifier depends on a B identifier, "org.myco:project-B:1.11".

In one implementation, the DGBM component 114 traverses each of the identifiers in the dependency graph 200 to determine the set of identifiers that match user-specified criteria. The DGBM component 114 may traverse the dependency graph 200 in depth first process by traversing child identifiers before sibling identifiers. The DGBM component 114 may traverse the dependency graph 200 in breadth-first process by traversing sibling identifiers before child identifiers.

In one implementation, the DGBM component 114 combines the matching identifiers resulting from graph traversal starting at the specified root identifier and matching the specified graph filtering criteria for each graph specification, using a set operation defined in the configuration. The result may be a single set of the identifiers to include in the output. For example, when the configuration indicates that results are to be combined using a UNION operation, the results for graph specification will be added to a single set, which allows exactly one occurrence of any given identifier. Accordingly, the two results are added together and duplicated identifiers are eliminated.

In one implementation, for each of the identifiers in the dependency database 108, the DGBM component 114 retrieves a list of files corresponding to each identifier, using a list of file-name patterns from the configurations to filter content associated with the identifier for inclusion in the result. In one implementation, once the set of identifiers that are to be included in the output are selected, the DGBM component 114 translates files of the selected set of identifiers into the files to be included in a repository output in order to generate a software artifact repository (repository) 116. The DGBM component 114 may perform this translation by iterating through the identifiers, and applying file-name patterns from the configuration (included in the identifiers) to a list of files for each of the identifiers. The files listed for the identifier are files that are uniquely associated with a particular identifier. These files may result from a project build and are added to the repository at the end of that build process. The list of files may be retrieved from a combination of local file system and network directories in order to populate the repository output. In one implementation, the DGBM component 114 may compare the list of files for the identifier with the file-name pattern in the identifier. When a file in the list of files for the identifier does not match with the file-name pattern in the identifier, then the DGBM component 115 may discard the file. As such, the discarded file is excluded from being included in a repository output. When the list of the files for the identifier includes a file that matches the file-name pattern in the identifier, the DGBM component 114 includes the file in the repository output. In one implementation, the DGBM component 114 adds each of the files in the repository output to a resulting zip archive. The DGBM component 114 may send the resulting zip archive to a user.

Figure 3:
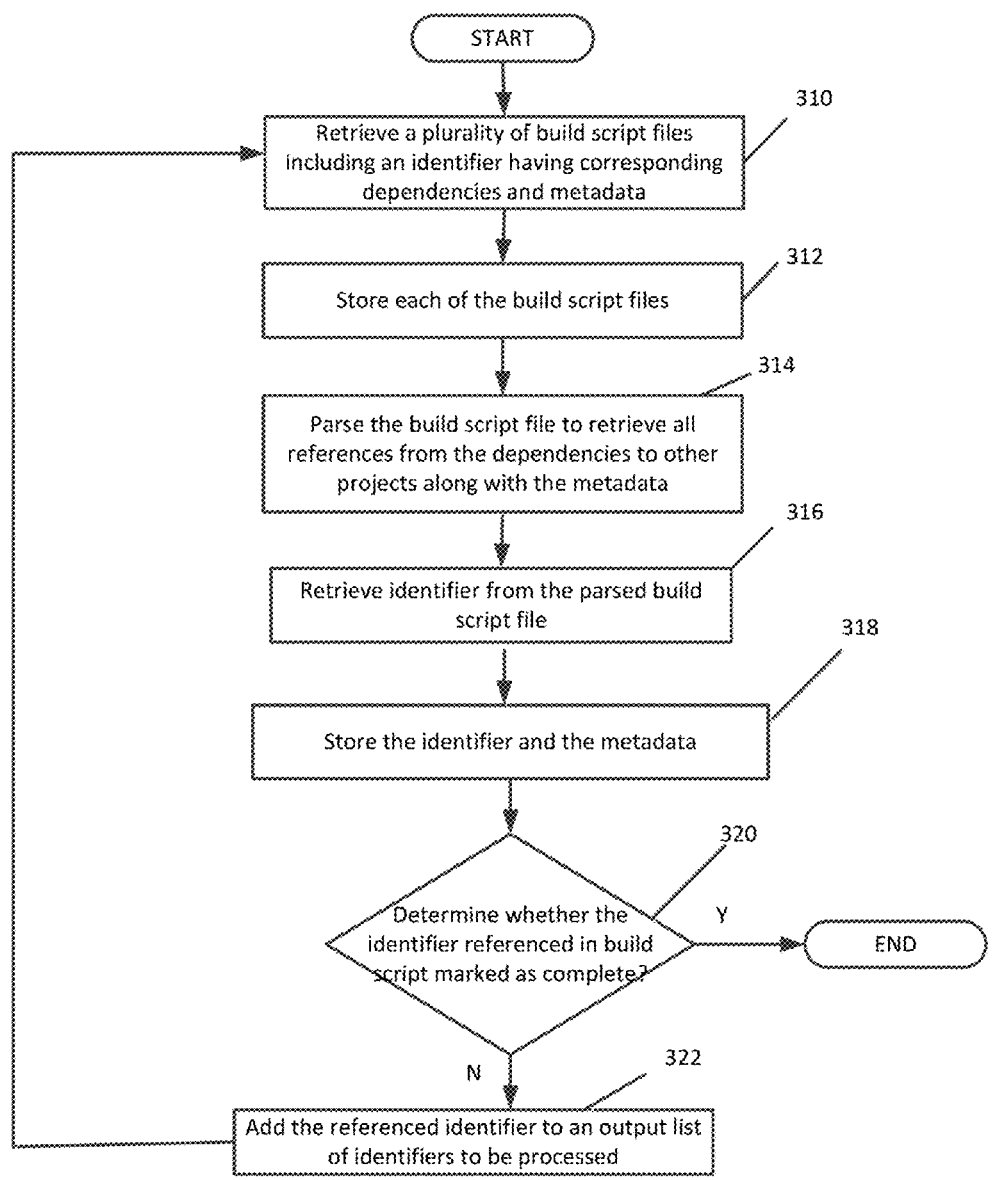
FIG. 3 illustrates a method for employing dependency graph in software build projects according to one implementation of the invention.

FIG. 3 illustrates a method 300 for discovering dependencies in software build projects according to one implementation of the invention. Method 300 may be performed by processing logic that may comprise hardware (e.g., circuitry, dedicated logic, programmable logic, microcode, etc.), software (such as instructions run on a processing device), or a combination thereof. In one implementation, method 300 is performed by the dependency graph build and management (DGBM) component 114 of FIG. 1.

Method 300 begins at block 310 where a plurality of build script files including an identifier having corresponding dependencies and metadata are retrieved. As discussed above, a build script defines a sequence of build operations, which are associated with a project, to be performed in order to produce a software product. Each operation specifies a build tool to be used including a source code and/or other artifacts to be processed. The identifier is unique to the build script files and is used to identify a collected output (executable) from a single module in project build. Also, as discussed above, the dependencies are artifacts needed to perform the operations specified in the project and the metadata, which defines a relationship between the identifiers or the projects. The metadata may include a way in which the dependency is used for the project.

At block 312, each of the build script files are stored. At block 314, parse the build script file to retrieve all references from the dependencies to other projects along with the metadata. At block 316, retrieve identifier from the parsed build script file. At block 318, store the identifier and the metadata. In one implementation, the identifier and the metadata are stored in a dependency database. As such, when another identifier needs the references to the other projects the references and the metadata can be queried and retrieved from the dependency database. At block 320, it is determined whether the identifier referenced in the build script marked as complete. As discussed above, the build script is marked as complete when a project referenced from its dependencies is identified. As such, the complete identifier includes the references to the project and the corresponding metadata. As discussed above, the metadata defines a relationship between the identifiers or the projects in the software artifact, When, at block 320, it is determined that the identifier referenced in the build script is marked as complete, then process ends for that identifier. When, at block 320, it is determined that the identifier referenced in the build script is not marked as complete, then at block 322, the referenced identifier is added to an output list of identifiers to be processed. The method 300 is repeated from block 310.

Figure 4:
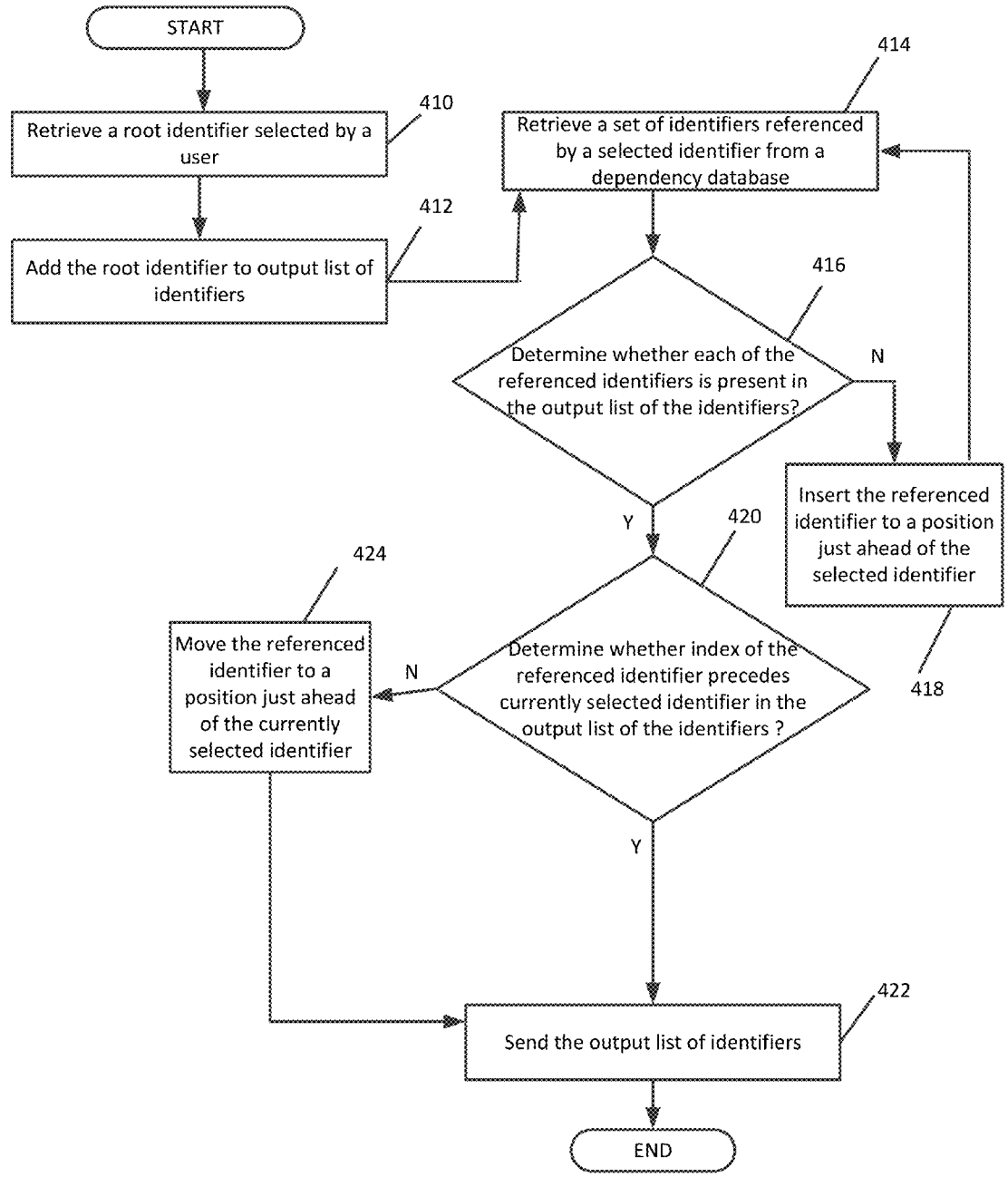
FIG. 4 illustrates a method for employing dependency graph in software build projects according to another implementation of the invention.

FIG. 4 illustrates a method 400 for determining an order (build order) to build the project based on the dependencies discovered in software build projects in FIG. 3 according to one implementation of the invention. Method 400 may be performed by processing logic that may comprise hardware (e.g., circuitry, dedicated logic, programmable logic, microcode, etc.), software (such as instructions run on a processing device), or a combination thereof. In one implementation, method 400 is performed by the dependency graph build and management (DGBM) component 114 of FIG. 1.

Method 400 begins at block 410 where a root identifier selected by a user is retrieved. At block 412, the root identifier is added to the output list of identifiers. In one implementation, the root identifier is the identifier to check first in the dependency database. In one implementation, the output list is a result of the method 400. At block 414, a set of identifiers referenced by a selected identifier from a dependency database is retrieved. In one implementation, initially the root identifier is the selected identifier is the selected identifier to be processed. At block 416, it is determined whether each of the referenced identifiers is present in the output list of the identifiers. When, at block 416, it is determined that each of the referenced identifiers is not present in the output list of the identifiers, then at block 418, the referenced identifier is inserted to a position just ahead of the selected identifier. Then, the block 414 is repeated for the referenced identifier, which is set as the current selected identifier.

When, at block 416, it is determined that each of the referenced identifiers is present in the output list of the identifiers, then at block 420 it is determined whether index of the referenced identifier precedes currently selected identifier in the output list of the identifiers. When at block 420 it is determined that the index of the referenced identifier precedes currently selected identifier, then at block 422, the output list of identifiers is sent. In one implementation, the output list is sent to the user. In one implementation, the processing of the referenced identifier is stopped when it is determined that the referenced identifier is present in the output list of the identifiers and the index of the referenced identifier precedes currently selected identifier in the output list of the identifiers, When at block 420, it is determined that the index of the referenced identifier does not precede the currently selected identifier, then at block 424, the referenced identifier is moved to a position just ahead of the currently selected identifier, which is followed by repeat of block 422.

Figure 5:
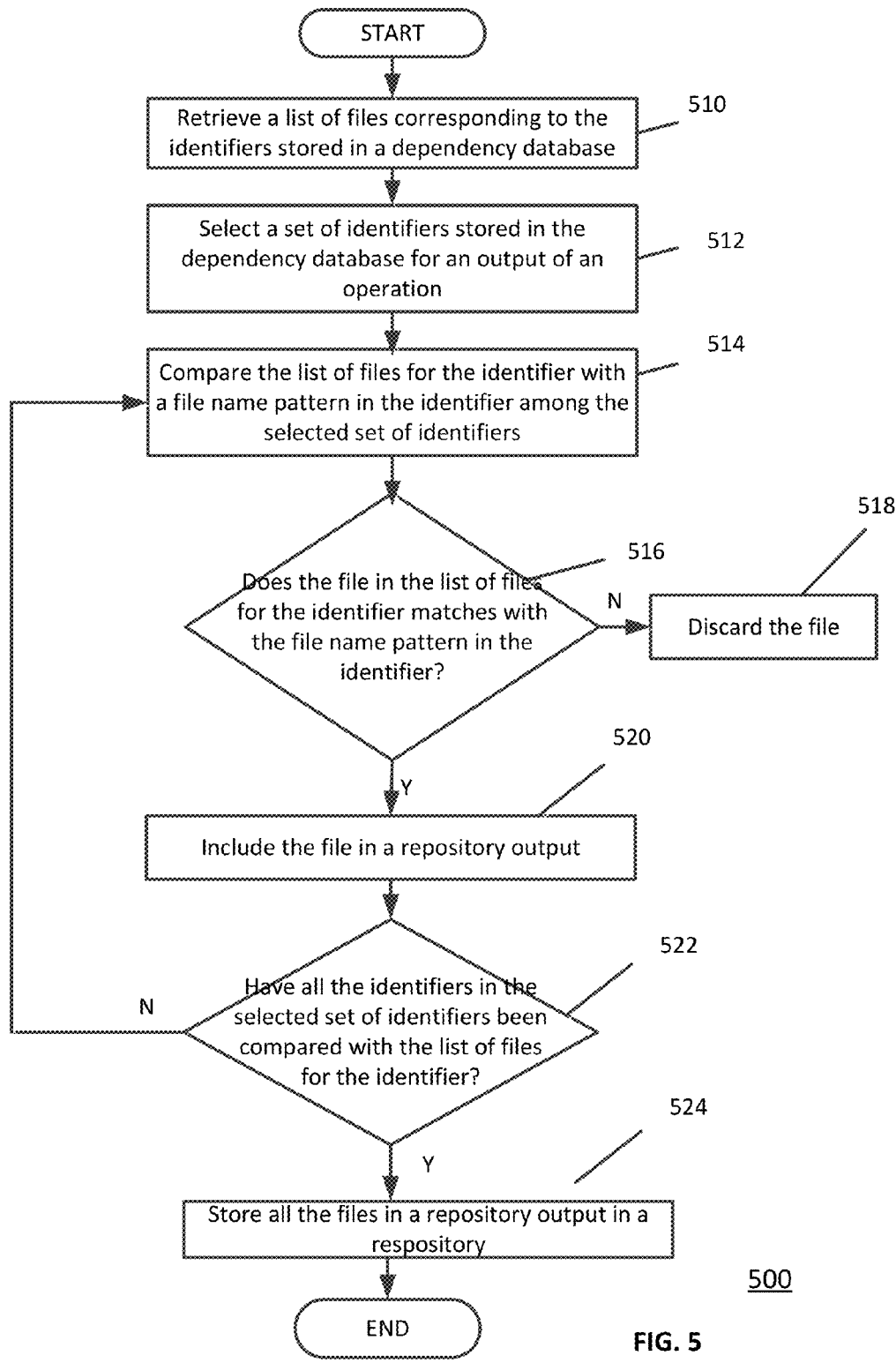
FIG. 5 illustrates a method for employing dependency graph in software build projects according to a further implementation of the invention.

FIG. 5 illustrates a method 500 for generating a software artifact repository (repository) based on the dependencies discovered in software build projects in FIG. 3 according to one implementation of the invention. Method 500 may be performed by processing logic that may comprise hardware (e.g., circuitry, dedicated logic, programmable logic, microcode, etc.), software (such as instructions run on a processing device), or a combination thereof. In one implementation, method 500 is performed by the DGBM component 110 of FIG. 1.

Method 500 begins at block 510 where a list of files corresponding to all the identifiers stored in a dependency database is retrieved. In one implementation, the list of files are retrieved using a list of file-name patterns from the configurations to filter the content for inclusion in a result. The result may be the set of identifiers to include in the output. The files listed for the identifier are files that are uniquely associated with a particular identifier. The list of files may be retrieved from a combination of local file system and network directories in order to populate the repository output. At block 512 where a set of identifiers stored in the dependency database are selected for an output of an operation. In one implementation, the output for each graph specification using a set operation is defined in the configuration of the build script file. At block 514, the list of files for the identifier is compared with the file-name pattern in an identifier among the selected set of identifiers. At block 516, it is determined whether a file in the list of the files for the identifier matches with the file-name pattern in the identifier. When at block 516, it is determined that a file in the list of files for the identifier does not match with the file-name pattern in the identifier, then at block 518, the file is discarded. In one implementation, the discarded file is excluded from being included in a repository output.

When at block 516, it is determined that a file in the list of files for the identifier matches with the file-name pattern in the identifier, then at block 520, the file is included in a repository output. At block 522, it is determined whether all the identifiers in the selected set of identifiers have been compared with the list of files for the identifier. When, at block 522, it is determined that not all the identifiers in the selected set of identifiers have been compared with the list of files for the identifier, then process is repeated from block 514 for the rest of the identifiers. When, at block 522, it is determined that all the identifiers in the selected set of identifiers are compared with the list of files for the identifier, then at block 524, all the files included in the repository output are stored in the repository. In one implementation, all the files included in the repository output are added to a resulting zip archive. The resulting zip archive may be send to a user.

Figure 6:
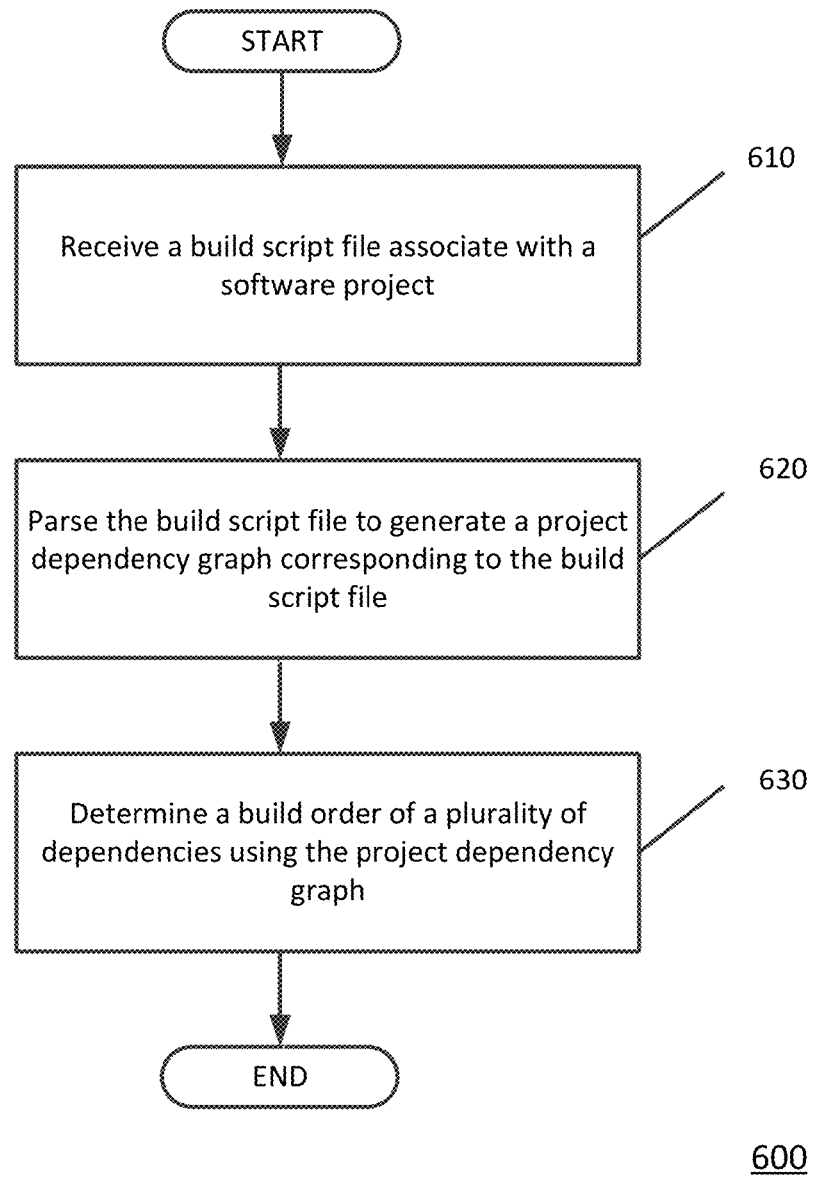
FIG. 6 illustrates a method for determining a build order using a dependency graph according to a further implementation of the invention.

FIG. 6 illustrates a method 600 for determining an order (build order) to build the project using the dependency graph according to one implementation of the invention. An example of the dependency graph is provided in the dependency graph 200 in FIG. 2. Method 600 may be performed by processing logic that may comprise hardware (e.g., circuitry, dedicated logic, programmable logic, microcode, etc.), software (such as instructions run on a processing device), or a combination thereof. In one implementation, method 600 is performed by the dependency graph build and management (DGBM) component 114 of FIG. 1.

Method 600 begins at block 610 where a build script file associated with a software project is received. In one implementation, the build script file identifies a plurality of project dependencies (dependencies) associated with the software project. In one implementation, each of the dependencies among the plurality of dependencies is provided by at least one of an identifier of another build script file (different from the build script file) or a definition of a build operation. In one implementation, the definition of the build operation includes an identifier of a build tool and an identifier of a software artifact provided by at least one of an identifier of a source code repository or an identifier of a binary module. At block 620, the build script file is parsed to generate a project dependency graph (dependency graph) corresponding to the build script file. In one implementation, the dependency graph includes a plurality of vertices representing to a plurality of dependencies and further includes a plurality of edges representing relationships between the plurality of the dependencies.

In one implementation, the parse of the build script file includes representing the another build script file as a non-terminal vertex among the plurality of vertices of the dependency graph and recursively parsing the another build script file. In one implementation, the parse of the build script file includes representing the binary module as a terminal vertex among the plurality of dependencies of the dependency graph. At block 630, a build order of the plurality of dependencies is determined using the dependency graph. In one implementation, the build order is determined by traversing the dependency graph starting from a terminal vertices.

Figure 7:
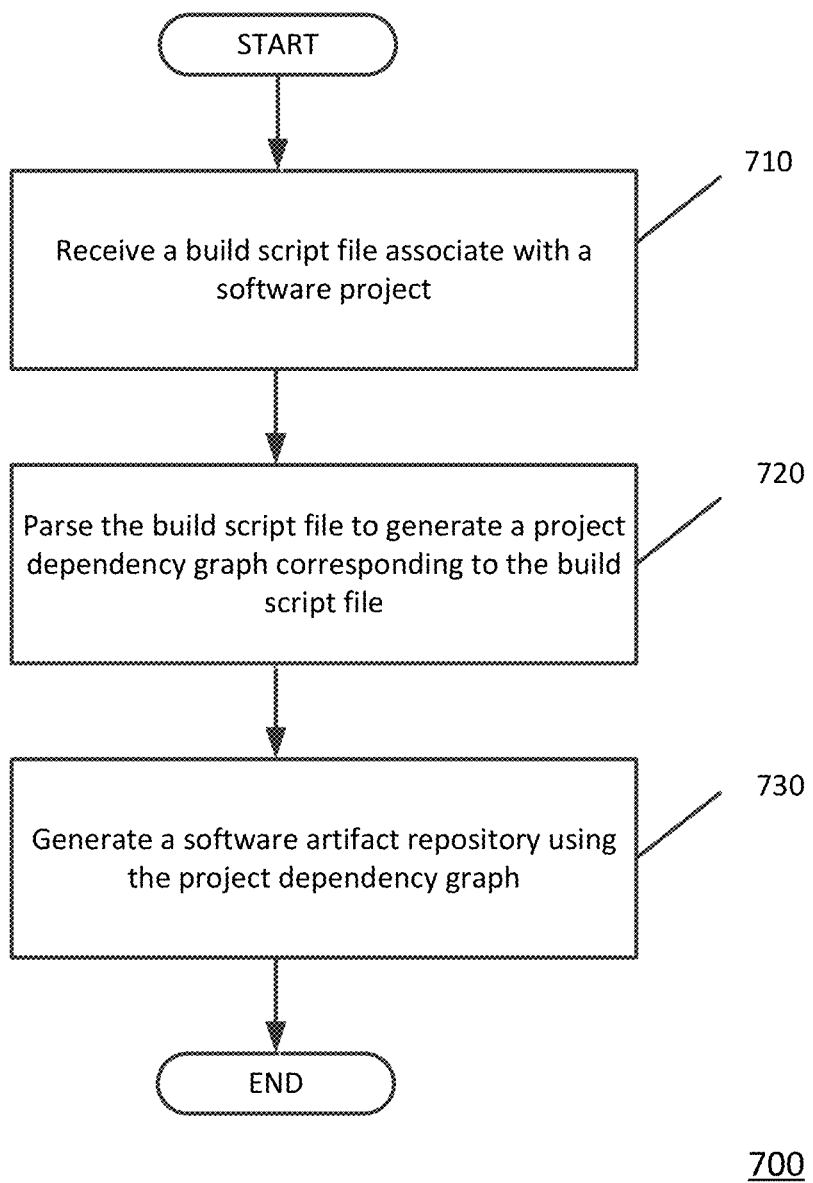
FIG. 7 illustrates a method for generating a software artifact repository using dependency graph according to a further implementation of the invention.

FIG. 7 illustrates a method 700 for generating a software artifact repository (repository) using the dependency graph according to one implementation of the invention. An example of the dependency graph is provided in the dependency graph 200 in FIG. 2. Method 700 may be performed by processing logic that may comprise hardware (e.g., circuitry, dedicated logic, programmable logic, microcode, etc.), software (such as instructions run on a processing device), or a combination thereof. In one implementation, method 700 is performed by the dependency graph build and management (DGBM) component 114 of FIG. 1.

Method 700 begins at block 710 where a build script file associated with a software project is received. In one implementation, the build script file identifies a plurality of project dependencies (dependencies) associated with the software project. In one implementation, each of the dependencies among the plurality of dependencies is provided by at least one of an identifier of another build script file (different from the build script file) or a definition of a build operation. In one implementation, the definition of the build operation includes an identifier of a build tool and an identifier of a software artifact provided by at least one of an identifier of a source code repository or an identifier of a binary module. At block 720, the build script file is parsed to generate a project dependency graph (dependency graph) corresponding to the build script file. In one implementation, the dependency graph includes a plurality of vertices representing to a plurality of dependencies and further includes a plurality of edges representing relationships between the plurality of the dependencies. In one implementation, the parse of the build script file includes representing the another build script file as a non-terminal vertex among the plurality of vertices of the dependency graph and recursively parsing the another build script file. In one implementation, the parse of the build script file includes representing the binary module as a terminal vertex among the plurality of dependencies of the dependency graph. At block 730, a software artifact repository (repository) is generated using the dependency graph. In one implementation, the software artifact repository is generated by traversing the dependency graph.

Figure 8:
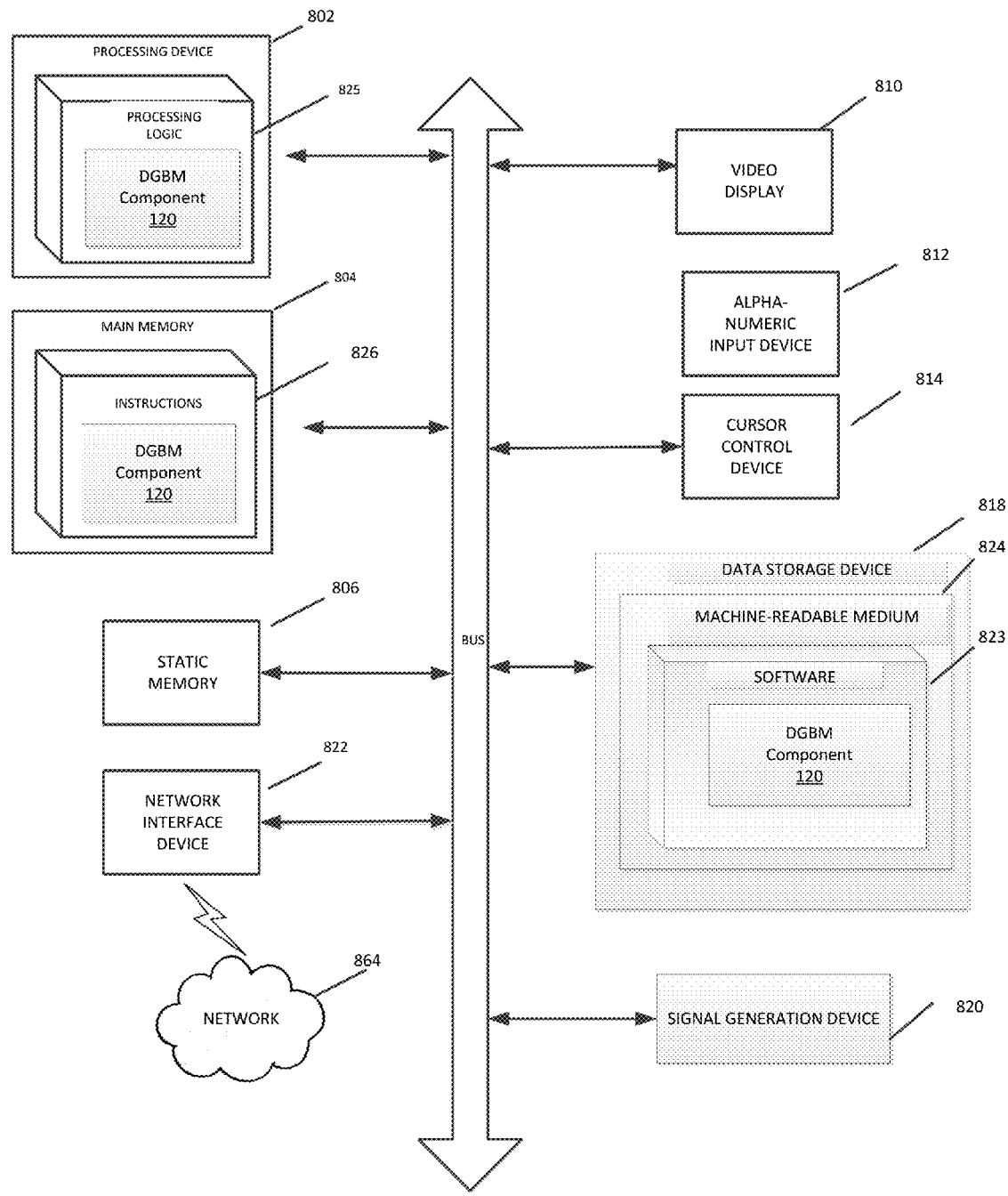
FIG. 8 illustrates a block diagram of one implementation of a computer system.

FIG. 8 illustrates a diagrammatic representation of a machine in the example form of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 800 includes a processing device 802 (e.g., processor, CPU, etc.), a main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 818, which communicate with each other via a bus 608.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 825 for performing the operations and steps discussed herein.

The computer system 800 may further include a network interface device 822 communicably coupled to a network 864. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 818 may include a machine-accessible storage medium 824 on which is stored software 823 embodying any one or more of the methodologies of functions described herein. The software 823 may also reside, completely or at least partially, within the main memory 804 as instructions 826 and/or within the processing device 802 as processing logic 825 during execution thereof by the computer system 800; the main memory 804 and the processing device 802 also constituting machine-accessible storage media.

The machine-readable storage medium 824 may also be used to store instructions 826 to implement a dependency graph build and management (DGBM) component 114 to implement initializing a VM on a host, such as the DGBM component 114 described with respect to FIG. 1, and/or a software library containing methods that call the above applications. While the machine-accessible storage medium 424 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions, which follow, are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "parsing", "determining", "representing", "retrieving", "storing", "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
receiving, by a processing device, a first build script file that defines a sequence of build operations associated with a software project, the first build script file comprising an identifier that indicates a plurality of project dependencies associated with the software project;
parsing the first build script file to retrieve the identifier; and
generating a project dependency graph corresponding to the identifier of the first build script file, wherein the project dependency graph comprises a plurality of vertices representing to a plurality of project dependencies and further comprises a plurality of edges representing relationships between the plurality of the project dependencies.

2. The method of claim 1 further comprising determining a build order of the plurality of project dependencies using the project dependency graph.

3. The method of claim 2, wherein each of the project dependencies among the plurality of project dependencies is provided by at least one of an identifier of a second build script file or a definition of a build operation.

4. The method of claim 3, wherein parsing the first build script file comprises representing the second build script file as a non-terminal vertex among the plurality of vertices of the project dependency graph and recursively parsing the second build script file.

5. The method of claim 4, wherein the definition of the build operation comprises an identifier of a build tool and an identifier of a software artifact provided by at least one of an identifier of a source code repository or an identifier of a binary module.

6. The method of claim 5, wherein parsing the first build script file comprises representing the binary module as a terminal vertex among the plurality of project dependencies of the project dependency graph, wherein a terminal vertex is a vertex that is associated with a single edge.

7. The method of claim 6, wherein determining the build order of the plurality of the project dependencies comprises traversing the project dependency graph starting from terminal vertices among the plurality of vertices.

8. The method of claim 1 further comprising generating a software artifact repository using the project dependency graph.

9. The method of claim 8 wherein the generating the software artifact repository comprising traversing the project dependency graph.

10. A system comprising:
a memory;
a processing device operatively coupled to the memory to:
receive a first build script file that defines a sequence of build operations associated with a software project, the first build script file comprising an identifier that indicates a plurality of project dependencies associated with the software project;
parse the first build script file to retrieve the identifier; and
generate a project dependency graph corresponding to the identifier of the first build script file, wherein the project dependency graph comprises a plurality of vertices representing to the plurality of project dependencies and further comprises a plurality of edges representing relationships between the plurality of the project dependencies.

11. The system of claim 10 wherein the processing device is further to determine a build order of the plurality of project dependencies using the project dependency graph.

12. The system of claim 11, wherein each of the project dependencies among the plurality of project dependencies is provided by at least one of an identifier of a second build script file or a definition of a build operation.

13. The system of claim 12 wherein to parse the first build script file, the processing device is to represent the second build script file as a non-terminal vertex among the plurality of vertices of the project dependency graph and recursively parse the second build script file.

14. The system of claim 13, wherein to parse the first build script file, the processing device is to represent a binary module as a terminal vertex among the plurality of project dependencies of the project dependency graph, wherein a terminal vertex is a vertex that is associated with a single edge.

15. The system of claim 10, wherein the processing device to generate a software artifact repository using the project dependency graph.

16. A non-transitory computer-readable storage medium embodying instructions that, when executed by a processing device, cause the processing device to:
receive a first build script file that defines a sequence of build operations associated with a software project, the first build script file comprising an identifier that indicates a plurality of project dependencies associated with the software project;
parse the first build script file to retrieve the identifier; and
generate a project dependency graph corresponding to the identifier of the first build script file, wherein the project dependency graph comprises a plurality of vertices representing to the plurality of project dependencies and further comprises a plurality of edges representing relationships between the plurality of the project dependencies.

17. The non-transitory computer-readable storage medium of claim 16, wherein the processing device is further to determine a build order of the plurality of project dependencies using the project dependency graph.

18. The non-transitory computer-readable storage medium of claim 17, wherein each of the project dependencies among the plurality of project dependencies is provided by at least one of an identifier of a second build script file or a definition of a build operation.

19. The non-transitory computer-readable storage medium of claim 18 wherein to parse the first build script file, the processing device to represent the second build script file as a non-terminal vertex among the plurality of vertices of the project dependency graph and recursively parse the second build script file.

20. The non-transitory computer-readable storage medium of claim 19, wherein the processing device to generate a software artifact repository, the processing device is to traverse the project dependency graph.

* * * * *